May 15, 1923.
J. D. JACKSON
COOKING STOVE
Filed Jan. 4, 1922
1,455,292
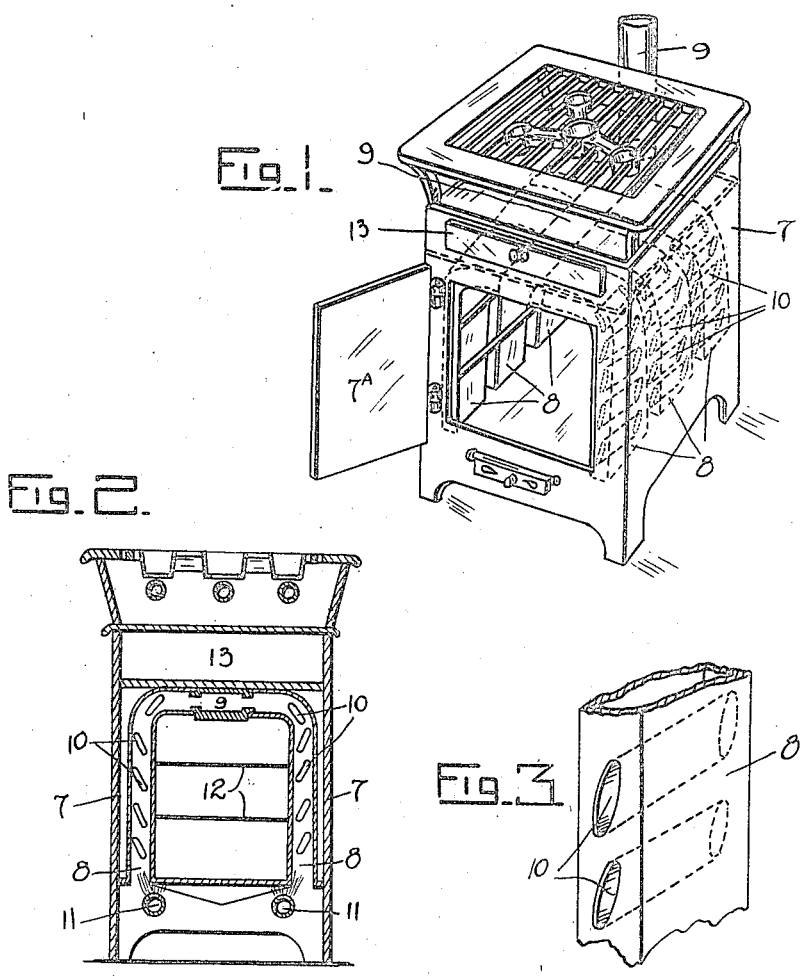

Patented May 15, 1923.

1,455,292

UNITED STATES PATENT OFFICE.

JAMES DOWSON JACKSON, OF MANLY, NEAR SYDNEY, NEW SOUTH WALES, AUSTRALIA.

COOKING STOVE.

Application filed January 4, 1922. Serial No. 526,880.

*To all whom it may concern:*

Be it known that I, JAMES DOWSON JACKSON, a subject of the King of Great Britain, residing at Manly, near Sydney, in the State of New South Wales, Commonwealth of Australia, have invented certain new and useful Improvements in Cooking Stoves, of which the following is a specification.

This invention has reference to gas fired domestic cooking stoves provided with a non contact oven or ovens with or without a utensil heating top, my object being to maintain a comparatively high heat efficiency with a small consumption of gas whilst ensuring a good circulation of heated air in the oven.

The invention consists primarily in providing within the oven one or more vertical or inclined heat chambers or passages through which the heated combustion gases pass from a burner or burners below, said chambers having one or more open ended tubes through which the heated air within the oven may circulate. The heat chambers may be on two or three sides of the stove leaving the fourth side clear for the oven door. Above the oven is preferably positioned a second smaller oven heated by radiation from the lower oven over which again may be the utensil heating top. This has integral therewith or attached thereto means for heating one or more utensils from the one or more burners comprising a central ring or annulus which depends over the central burner and branching from said central ring, according to the number of subsidiary rings, are passage ways or flues whereby heated gases may be led to the subsidiary rings. In the event of the central ring being covered by a utensil or loose cover, heated gases will pass to one or all the subsidiary rings on which are utensils, or one or more when not covered by a utensil may have a close fitting lid or cover to prevent escape of the heating gases.

The subsidiary rings may also have their respective burners for use when required.

Referring to the sheet of drawings herewith,

Figure 1 illustrates in perspective a stove constructed according to the invention.

Figure 2 is a sectional elevation thereof.

Figure 3 is a fragmentary perspective view of one of the heating chambers and tubes.

The same numerals indicate the same or corresponding parts.

7 are the outer walls, suitably insulated, and 7$^A$ the door of the stove in which are placed the heating chambers 8 at opposite sides of the stove but not abutting the walls, and at the rear, if desired. The chambers 8 are open at the lower end to allow the heating gases to pass up same, being led to the atmosphere through the flue 9. Tubes 10, preferably of oval section, are secured across the chambers 8 upon which tubes the heated gases from the burners 11 impinge thereby heating the air therein and said tubes are open at each end to the oven permitting a free circulation in the oven. Shelves 12 are provided and a chamber 13 is placed above the flue 9, said chamber being heated by radiation.

I claim:

In gas fired domestic cooking stoves of the noncontact oven type, in which the combustion gases do not contact with the food being cooked, an upwardly extending heat chamber on one side of the oven in communication with the heating gases and with an escape flue and tubes within said chamber open at each end to the oven but not to the heating gases substantially as described.

In testimony whereof I have hereunto set my hand.

JAMES DOWSON JACKSON.